United States Patent Office 3,557,083
Patented Jan. 19, 1971

3,557,083
CELLULOSE TRIACETATE CONTAINING AT MOST 150 PARTS PER MILLION BY WEIGHT OF COMBINED SULFURIC ACID AND PROCESS FOR ITS PRODUCTION
Jean Sacco, Bron, Rhone, France, assignor to Societe Rhodiaceta, Paris, France, a corporation of France
No Drawing. Filed May 20, 1968, Ser. No. 730,601
Claims priority, application France, May 22, 1967, 107,260
Int. Cl. C08b 3/08, 3/28
U.S. Cl. 260—230                                      6 Claims

ABSTRACT OF THE DISCLOSURE

Cellulose triacetate containing at most 150 parts per million by weight of combined sulphuric acid and having a dissolution factor of at least 90 in 10 minutes is produced by precipitating with water cellulose triacetate from an acetic gum obtained by the acetylation of wood pulp in the presence of sulphuric acid as catalyst, then displacing the water in the resulting water-impregnated cellulose triacetate with methanol, then displacing the methanol with ethyl ether or isopropyl ether, and finally drying the ether-impregnated cellulose triacetate.

BACKGROUND OF THE INVENTION

It is known that cellulose triacetate is generally obtained by the acetylation of cellulose in the form of wood pulp or cotton linters by means of acetic anhydride in the presence of acetic acid as diluent and sulphuric acid as catalyst. A homogeneous viscous mixture results, which is referred to hereinafter as acetic gum, from which the triacetate is obtained by precipitation.

In general this precipitation is effected with water which leads to a cellulose triacetate with a low sulphuric acid content but also a low solubility. However, it is likewise known to effect it with certain organic compounds, especially such as ethyl alcohol, ether, carbon tetrachloride or benzene. When the organic liquid is a good solvent for the catalyst employed, it removes said catalyst out of the precipitated triacetate. When ether, which is a bad solvent for sulphuric acid, is used to precipitate cellulose tracetate manufactured with sulphuric acid as catalyst, the precipitated triacetate contains a large amount of sulphuric acid, both in the free and combined state, and it is extremely difficult to remove this acid.

The amount of this sulphuric acid may vary from 4,000 to 12,000 parts per million by weight and even more, and the resulting cellulose triacetate is unsuitable for certain purposes, especially for spinning, and this a serious disadvantage.

It is a purpose of the present invention to avoid the above disadvantage.

SUMMARY OF THE INVENTION

The present invention provides cellulose triacetate containing less than 150 parts per million by weight of combined sulphuric acid and having a dissolution factor of at least 90 in 10 minutes.

The present invention also provides a process for the production of this new cellulose triacetate which comprises precipitating with water cellulose triacetate from an acetic gum produced with sulphuric acid as catalyst, displacing with a liquid aliphatic ether the aqueous liquid with which the precipitated triacetate is impregnated, and drying the resulting product. Preferably said liquid aliphatic ether contains from 4 to 6 carbon atoms in the molecule. In some instances it is advantageous to effect an intermediate displacement of the aqueous liquid with another liquid (herein referred to also as "intermediate liquid") before the displacement with the aliphatic ether, which other liquid must be miscible with the aliphatic ether.

The cellulose triacetate according to the invention contains a sufficiently low quantity of combined sulphuric acid for it to be suitable to undergo further treatment such as spinning and it has a high speed of dissolution which is much higher than that of triacetate which has merely been precipitated with water.

The dissolution factor is determined by the following test: 2.5 g. of dry cellulose triacetate in pulverulent form are introduced into a 100 ml. flask containing 5 glass balls and 75 ml. of a solvent mixture of methylene chloride/methanol in the proportion of 90/10 by weight; the closed flask is placed on a three-dimensioinal stirrer turning at 150 cycles/minute.

At regular time intervals 3 ml. of solution are rapidly withdrawn; this material is put into a beaker containing boiling water. The precipitate is recovered by filtration, dried and weighed.

If $p$ is the weight in grams of the precipitate corresponding to the $n$th sample, the percentage by weight of dissolved triacetate is given by the formula:

$$\frac{p[75-3(n-1)]}{3\times 2.5}\cdot 100$$

the number obtained for this percentage represents the dissolution factor.

For the displacement of the impregnation liquid of the precipitated triacetate, in accordance with the invention, there are particularly suitable ethyl ether and isopropyl ether, although other aliphatic ethers may likewise be used without going outside the scope of the present invention.

The aliphatic ethers are not very miscible with water and, as indicated above, it is generally preferred to displace the liquid of impregnation for the precipitated cellulose triacetate first with another organic liquid and to then effect a second displacement of this other organic liquid by means of the ether. For example, methanol is particularly good as the other organic liquid for this purpose, but other low molecular aliphatic alcohols, e.g. having up to 4 C atoms, can likewise be used.

The following examples in which the parts and percentages are by weight are given in order to illustrate the invention but in no way to limit it.

Example 1

An acetic gum obtained in known maner by the acetylation of wood pulp in the presence of sulphuric acid containing:

| | Parts |
|---|---|
| Acetic acid | 82 |
| Cellulose triacetate | 13 |
| Water | 4 |
| Sulphuric acid (free or combined with the triacetate) | 1 | is used.

This gum is stabilized by the addition of a small amount of triethanolamine and is then diluted with acetic acid until an approximately 3.75% solution results.

732 parts of this diluted gum are placed into a receptacle provided with a stirrer and 1100 parts of water are added over a period of one hour.

The resulting precipitate is then filtered and carefully washed first with water, then with methanol and finally with ethyl ether.

One portion A of the precipitate is dried in a desiccator, first with silica gel and then with phosphoric acid anhydride under a vacuum of the order of $10^{-2}$ mm. of mercury.

Another portion B of the precipitate is dried in a ventilated stove at 76.5° C.

The samples A and B dried under different conditions each contain 59.7% of combined acetic acid and 34 parts per million of combined sulphuric acid, whereas a sample directly precipitated with ethyl ether under otherwise the same conditions as the precipitation with water described hereinabove contains, for a similar combined acetic acid content of 59.67%, 4230 parts per million of combined sulphuric acid.

By examining the samples A and B according to the disolution test described above the following dissolution factors are obtained as a function of the stated stirring times:

| Time of stirring in minutes | 1 | 2 | 5 | 10 |
|---|---|---|---|---|
| Sample A | 63.2 | 74.5 | 96.8 | |
| Sample B | 40.9 | 71.8 | 89.6 | 94.7 |

By way of comparison, the water precipitated cellulose triacetate washed with methanol is dried without any displacement with ethyl ether.

A portion C is dried as the sample A and a portion D as the sample B.

The dissolution factors of the samples C and D are then as follows:

| Time of stirring in minutes | 1 | 2 | 5 | 10 | 15 | 20 |
|---|---|---|---|---|---|---|
| Sample C | 24.1 | 33.7 | 53.2 | 76.3 | 89.2 | 96.4 |
| Sample D | 17.6 | 31.4 | 49.8 | 75.5 | 87.9 | |

Example 2

The same gum as that of Example 1 is diluted and precipitated with water in the same way as in Example 1.

After several washings, first with water and then with methanol, the precipitate is finally carefully washed with isopropyl ether.

A portion E of the precipitate resulting in this way is dried under a vacuum in the same manner as the portion A of Example 1 and another portion F is dried in a ventilated oven at 76.5° C.

These samples each contain 59.70% of combined acetic acid and 42 parts per million of combined sulphuric acid, whereas a sample directly precipitated with isopropyl ether under the same conditions as the precipitation effected with water, contains 59.84% of combined acetic acid and 5900 parts per million of combined sulphuric acid.

The dissolution test described above for samples E and F had the following dissolution factors:

| Time of stirring in minutes | 1 | 2 | 5 |
|---|---|---|---|
| Sample E | 54.8 | 81.9 | 98.3 |
| Sample F | 57.2 | 86.5 | 96.7 |

By way of comparison, the triacetate precipitated with water as described in Example 1 is dried after careful washing with water but without any displacement. A portion G is dried in the same way as the sample A and another portion H is dried in a ventilated stove at 76.5° C.

The samples which each contain 59.70% of combined acetic acid and 34 parts per million of combined sulphuric acid were submitted to the dissolution test described above. The following dissolution factors are obtained:

| Time of stirring in minutes | 1 | 2 | 5 | 10 | 15 | 20 | 30 |
|---|---|---|---|---|---|---|---|
| Sample G | 2.6 | 7.2 | 19.0 | 36.1 | 48.3 | 72.5 | 88.3 |
| Sample H | 3.4 | 5.7 | 23.2 | 41.8 | 47.7 | 76.8 | 94.5 |

Thus the process of the invention enables the obtention of a new product which has at the same time a low combined sulphuric acid content (and is therefore very suitable for spinning operations) and a dissolution speed which is much higher than that of hitherto known cellulose triacetates precipitated by means of water; this represents an important economic and technical advantage.

Although the present invention is described herein with particular reference to specific details, it is not intended that such details shall be regarded as limitations upon the scope of the invention except insofar as included in the accompanying claims.

I claim:

1. A process for the production of cellulose triacetate containing at most 150 parts per million by weight of combined sulphuric acid and having a dissolution factor of at least 90 in 10 minutes, said dissolution factor being determined by the following test:

2.5 g. of dry cellulose triacetate in pulverulent form are introduced into a 100 ml. flask containing 5 glass balls and 75 ml. of a solvent mixture of methylene chloride/methanol in the proportion of 90/10 by weight; the closed flask is placed on a three-dimensional stirrer turning at 150 cycles/minutes; at regular time intervals 3 ml. of solution are rapidly withdrawn; this material is put into a beaker containing boiling water; the precipitate is recovered by filtration, dried and weighed; if $p$ is the weight in grams of the precipitate corresponding to the $n$th sample, the percentage by weight of dissolved triacetate is given by the formula:

$$\frac{p[75-3(n-1)]}{3 \times 2.5} \cdot 100$$

which process comprises precipitating with water cellulose triacetate from an acetic gum produced with sulphuric acid as catalyst, displacing with an aliphatic ether the aqueous liquid impregnating the precipitated cellulose triacetate and drying the resulting product.

2. A process for the production of cellulose triacetate containing at most 150 parts per million by weight of combined sulphuric acid and having a dissolution factor of at least 90 in 10 minutes, said dissolution factor being being determined by the following test:

2.5 g. of dry cellulose triacetate in pulverulent form are introduced into a 100 ml. flask containing 5 glass balls and 75 ml. of a solvent mixture of methylene chloride/methanol in the proportion of 90/10 by weight; the closed flask is placed on a three-dimensional stirrer turning at 150 cycles/minute; at regular time intervals 3 ml. of solution are rapidly withdrawn; this material is put into a beaker containing boiling water; the precipitate is recovered by filtration, dried and weighed; if $p$ is the weight in grams of the precipitate corresponding to the $n$th sample, the percentage by weight of dissolved triacetate is given by the formula:

$$\frac{p[75-3(n-1)]}{3 \times 2.5} \cdot 100$$

which process comprises precipitating with the water cellulose triacetate from an acetic gum produced with sulphuric acid as catalyst, displacing the aqueous liquid impregnating the precipitated cellulose triacetate with an intermediate liquid and then with an aliphatic ether, said intermediate liquid being a non-solvent for the cellulose triacetate and being miscible with aliphatic ether.

3. A process according to claim 1 in which the aliphatic ether is ethyl ether.

4. A process according to claim 1, in which the aliphatic ether is isopropyl ether.

5. A process according to claim 2, in which the intermediate liquid is a low molecular weight aliphatic alcohol.

6. A process according to claim 5, in which said alcohol is methanol.

References Cited
UNITED STATES PATENTS

| | | | |
|---|---|---|---|
| 2,418,211 | 4/1947 | Williams | 106—196 |
| 2,805,171 | 9/1957 | Williams | 106—196 |
| 3,109,743 | 11/1963 | Fleck et al. | 260—227 |

DONALD E. CZAJA, Primary Examiner

R. W. GRIFFIN, Assistant Examiner

U.S. Cl. X.R.

106—196; 260—227